(12) United States Patent
Yu et al.

(10) Patent No.: US 11,370,315 B2
(45) Date of Patent: Jun. 28, 2022

(54) HANDS-FREE CHARGING SYSTEM WITH INTERNAL POWER SOURCE

(71) Applicant: FORD GLOBAL TECHNOLOGIES, LLC, Dearborn, MI (US)

(72) Inventors: Lan Yu, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 17/002,175

(22) Filed: Aug. 25, 2020

(65) Prior Publication Data
US 2022/0063430 A1 Mar. 3, 2022

(51) Int. Cl.
*H02J 7/00* (2006.01)
*B60L 53/35* (2019.01)

(52) U.S. Cl.
CPC ............ *B60L 53/35* (2019.02); *H02J 7/0042* (2013.01); *H02J 2207/50* (2020.01); *H02J 2310/48* (2020.01)

(58) Field of Classification Search
CPC ................................. B60L 53/35; H02J 7/0042
USPC ........................................................ 320/107
See application file for complete search history.

(56) References Cited

U.S. PATENT DOCUMENTS

| | | | |
|---|---|---|---|
| 9,056,555 B1 | 6/2015 | Zhou | |
| 9,592,742 B1* | 3/2017 | Sosinov | ................... B60L 53/14 |
| 10,099,566 B2 | 10/2018 | Wu et al. | |
| 2014/0292276 A1* | 10/2014 | Osawa | .................. B60L 53/305 320/109 |
| 2014/0347019 A1* | 11/2014 | Lando | ..................... H02P 9/305 322/32 |
| 2018/0015836 A1* | 1/2018 | Madon | ..................... B60L 53/16 |
| 2019/0135133 A1* | 5/2019 | Miller | ..................... B60L 53/16 |

FOREIGN PATENT DOCUMENTS

DE 102018008241 A1 4/2019

* cited by examiner

*Primary Examiner* — Suchin Parihar
(74) *Attorney, Agent, or Firm* — David B. Kelley; Brooks Kushman P.C.

(57) ABSTRACT

A hands-free charging system includes an electrical power source and a ground unit electrically connected to the power source. The ground unit includes an energy-storage device and a robotic coupler having a connector and an actuator configured to move the connector into engagement with a vehicle charge port. The energy-storage device is configured to power the actuator. A switching arrangement is configured to selectively electrically connect the power source to the energy-storage device and to the connector. A controller is programmed to, in response to a request to charge a vehicle, connect the connector to a charge port when the connector is electrically disconnected from the power source using an internal power source.

20 Claims, 5 Drawing Sheets

HANDS-FREE CHARGING SYSTEM WITH INTERNAL POWER SOURCE

TECHNICAL FIELD

This disclosure relates to charging systems for electrified vehicles and more specifically to hands-free charging systems configured to automatically couple with the vehicle.

BACKGROUND

A plug-in vehicle may enable an operator to connect the vehicle to an external power source. The operator, for example, may manually connect and disconnect a charging cable to the vehicle for charging purposes. This arrangement may allow the operator to charge a battery of the vehicle at a number of geographic locations.

SUMMARY

According to one embodiment, a hands-free charging system includes an electrical power source and a ground unit electrically connected to the power source. The ground unit includes an energy-storage device and a robotic coupler having a connector and an actuator configured to autonomously move the connector into engagement with a vehicle charge port. The energy-storage device is configured to power the actuator. A switching arrangement is configured to selectively electrically connect the power source to the energy-storage device and to the connector. A controller is programmed to, in response to a request to charge a vehicle, (i) command the switching arrangement such that the connector is electrically disconnected from the power source, (ii) command movement of the actuator, using power from the energy-storage device, to couple the connector to the vehicle charge port while the connector is electrically disconnected from the power source, and (iii) command the switching arrangement such that the connector is electrically connected to the power source after the connector is coupled to the vehicle charge port.

According to another embodiment, a hands-free charging system includes an electric vehicle supply equipment (EVSE) configured to electrically connect to a power source and including a switching arrangement. A ground unit is connected to the EVSE by a cable. The ground unit has an energy-storage device and a robotic coupler with an actuator configured to move a connector into engagement with a vehicle charge port. The energy-storage device is configured to power the actuator. A controller is programmed to, in response to a request to charge a vehicle, (i) command the switching arrangement such that the ground unit is electrically disconnected from the power source, (ii) command movement of the actuator, using power from the energy-storage device, to couple the connector to the vehicle charge port while the ground unit is electrically disconnected from the power source, and (iii) command the switching arrangement such that the ground unit is electrically connected to the power source once the connector is coupled to the vehicle charge port.

According to yet another embodiment, a hands-free charging system has a connector configured to connect to a vehicle charge port, an energy-storage device, and an actuator configured to autonomously connect the connector to the vehicle. A method of charging a vehicle with the charging system includes, in response to a request to charge a vehicle: operating a switching arrangement of the hands-free charging system to electrically disconnect the actuator and the connector from a power grid; operating the actuator, using power from the energy-storage device, to couple the connector to the vehicle charge port while the connector and the actuator are electrically disconnected from the power grid; operating the switching arrangement to electrically connect the connector to the power grid; and charging the vehicle using the power grid.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
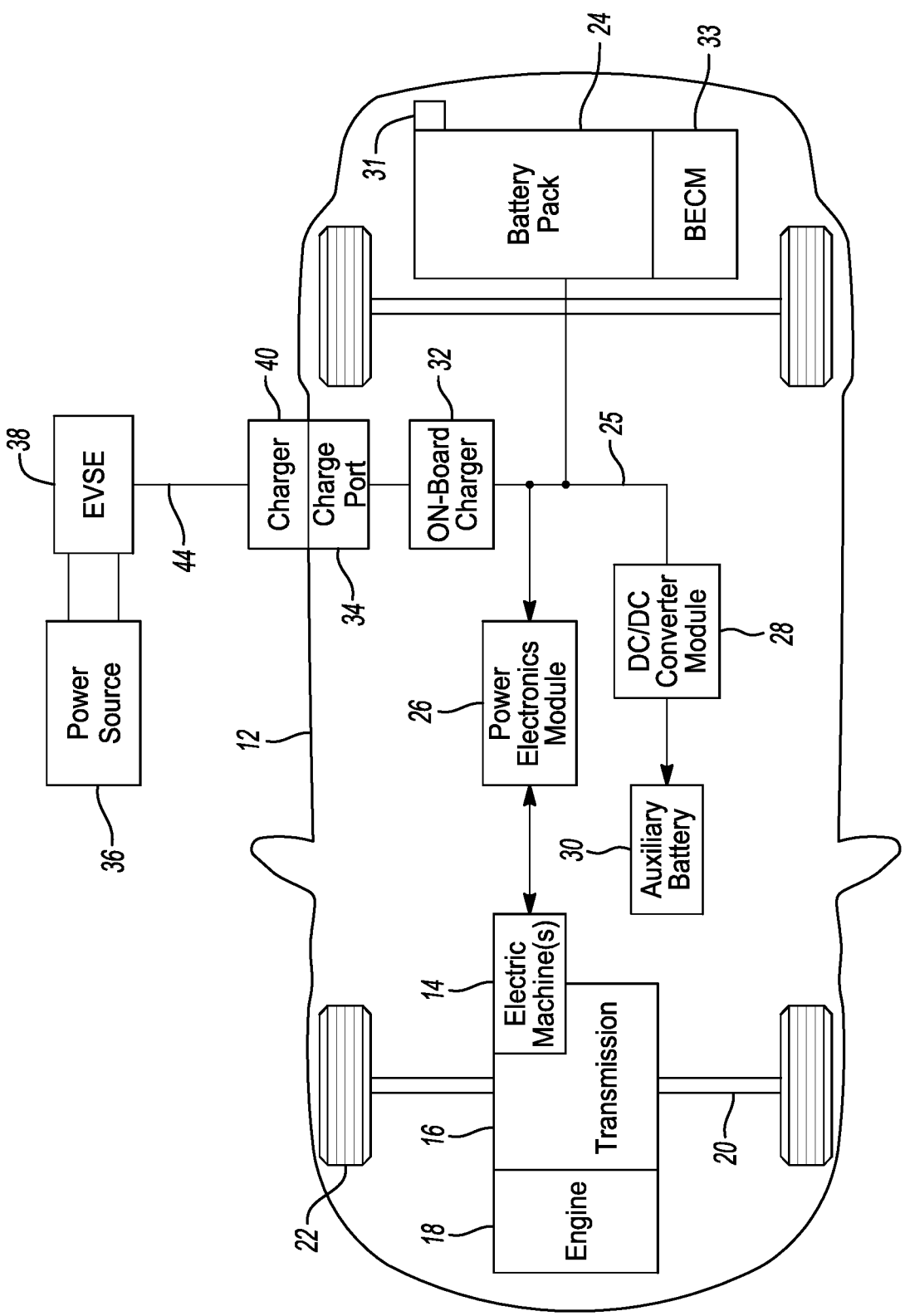
FIG. 1 is a schematic diagram of a plug-in hybrid vehicle and a hands-free charging system.

FIG. 1 depicts a schematic of a plug-in hybrid-electric vehicle (PHEV). Certain embodiments, however, may also be implemented within the context fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and slowing capability when the engine 18 is turned ON or OFF. The electric machines 14 also act as generators and can provide fuel economy benefits by recovering energy through regenerative braking. The electric machines 14 reduce pollutant emissions and increase fuel economy by reducing the workload of the engine 18.

A traction battery or battery pack 24 stores energy that can be used by the electric machines 14. The traction battery 24 typically provides a high-voltage (HV) direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal-management system. Examples of thermal-management systems include air cooling systems, liquid cooling systems, and a combination of air and liquid systems.

The traction battery 24 may be electrically connected to one or more power electronics modules 26 through one or more contactors. The one or more contactors isolate the traction battery 24 from other components when opened and connect the traction battery 24 to other components when closed. A power electronics module 26 is also electrically connected to the electric machines 14 and a high-voltage bus 25 and provides the ability to bi-directionally transfer energy between the traction battery 24 and the electric machines 14. For example, a typical traction battery 24 may provide a direct current (DC) voltage while the electric machines 14 may use a three-phase alternating current (AC) to function. The power electronics module 26 may convert the DC voltage to a three-phase AC current used by the electric machines 14. In a regenerative mode, the power electronics module 26 may convert the three-phase AC current from the electric machines 14 acting as generators to the DC voltage used by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12-volt battery). In other embodiments, the battery 30 may be 24 or 48 volts.

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a hands-free charging system that includes electric vehicle supply equipment (EVSE) 38 (also known as a charging system, a charging station, and the like) connected to an external power source 36. The external power source 36 may be an electrical power distribution network or grid as provided by an electric utility company. As shown, the external power source may be electrically coupled to the EVSE 38. The EVSE 38 is capable of providing DC and/or AC electric power to the EVSE 38. The EVSE 38 may be installed as a wall-mounted unit in a garage, alongside a building where vehicles typically park, or as a stand-alone unit.

The EVSE 38 may receive and transfer the received electrical power through a cord 44 to a ground unit 40. The ground unit 40 is not required to be on the ground/floor and in some embodiments, may be mounted on a wall, a charge-station housing, or other surface. The ground unit 40 is a hands-free and includes a robotic coupler configured to autonomously plug a connector of the ground unit 40 into a mating charge port 34 on the electric vehicle 12. The charge port 34 may be a dedicated port for the robotic coupler, e.g., the vehicle includes a second charge port for a manual connection, or charge port 34 may be a single, shared port. As one example, the external power may be AC power received at the charge port 34 that is converted to DC power by an on-board charger 32 located within the electric vehicle 12. The on-board charger 32 may then operate to charge the traction battery 24. Alternatively, the on-board charger 32 may be located in the EVSE 38 or the ground unit 40 external to the electric vehicle 10. In some embodiments, the EVSE 38 and the ground unit 40 may be packaged in a same housing.

The ground unit 40 and charge port 34 may utilize a conductive connection in which the electrical conductors (pins) in one connector make physical contact with the electrical conductors (pins) in the other connector. However, it is also contemplated that a wireless power transfer (WPT) system may be employed where a transmitter may provide electric power to a receiver without the use of physical electrical conductors (e.g., power may be transferred through free space). It is contemplated that the power output into a wireless field (e.g., magnetic induction, electric induction, etc.) may be received, captured by, or coupled by a "receiving coil" to achieve the power transfer.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, reference to "a controller" refers to one or more controllers. The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller within each of the subsystems identified above. Representative examples of parameters, systems, and/or components that may be directly or indirectly actuated using control logic executed by the controller. Used herein, "high voltage" refers to a voltage exceeding 42 V AC or 60 V DC. "Low voltage" refers to voltages that are not high.

Figure 2:
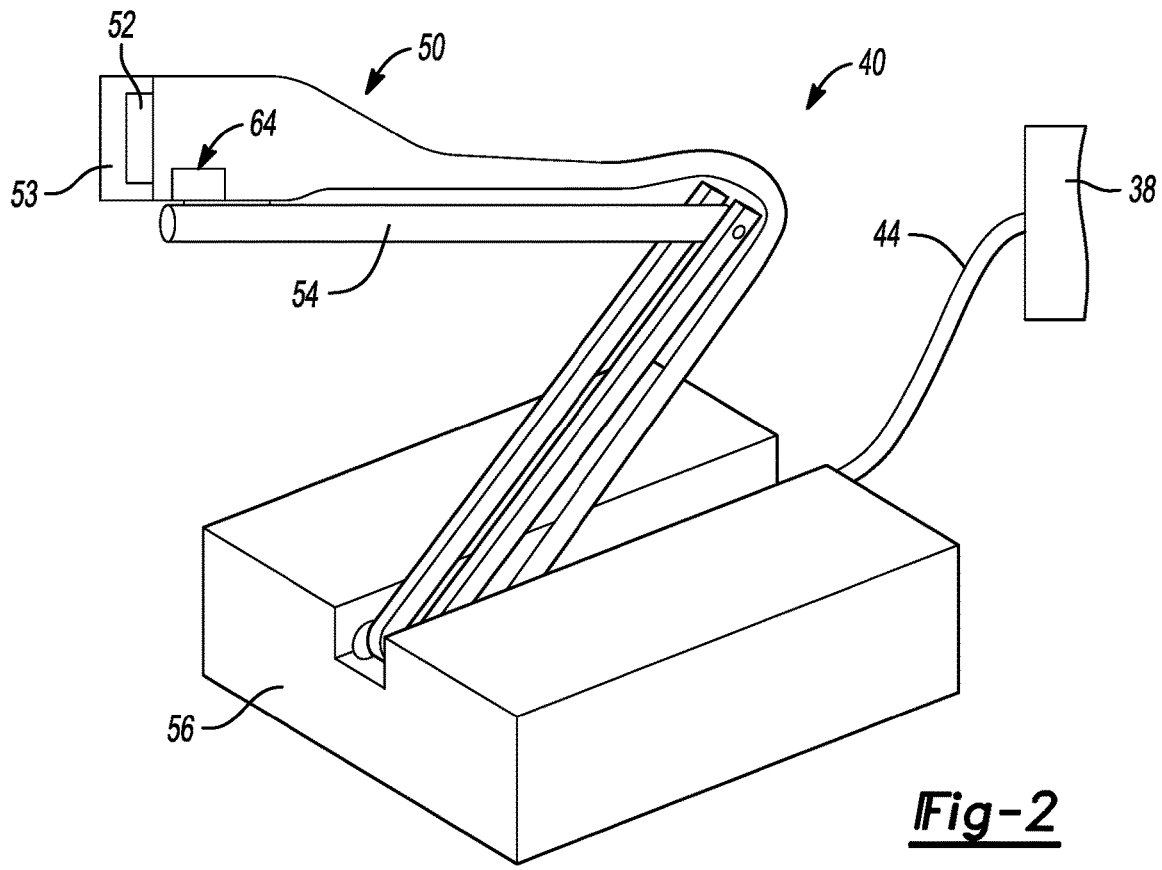
FIG. 2 is a perspective view of a robotic ground unit of a hands-free charging system according to an embodiment of the present disclosure.

Referring to FIG. 2, the ground unit 40 includes a robotic coupler 50 configured to autonomously plug a connector 52 into the vehicle charge port. The coupler 50 may include a robotic arm 54 that is mounted to a base 56 at one end and supports the connector 52 at the other end. The robotic arm 54 may be formed of one or more articulating segments driven by one or more actuators. The actuators may include electric motors, gearing, linkages, and the like. The robotic coupler 50 may be configured to move left and right, forward and back, up and down, and adjust yaw and pitch providing freedom of movement so that the connector 52 can be plugged into the vehicle charge port for a range of different vehicle positions.

The base 56 may be a stationary base (as shown) or may be movable. In a movable embodiment, for example, the base 56 may be supported on wheels, tracks, or the like allowing the ground unit 40 to be driven to the vehicle charge port. The base 56 is electrically connected to the EVSE 38 by the cord 44.

The robotic coupler 50 may include a cover 53 for the terminals of the connector 52. The cover 53 is movable between a closed position (shown) and an open position. When in the closed position, the terminals are protected from dirt and other debris and are isolated to prevent inadvertent contact with other objects. When the cover is in the open position, the terminals are exposed and can be inserted into mating terminals of the charge port 34. The cover 53 may be disposed over an end of the connector and is pivotal between the open and closed positions. Alternatively, the cover 53 may have one or more spring-loaded panels.

Figure 3:
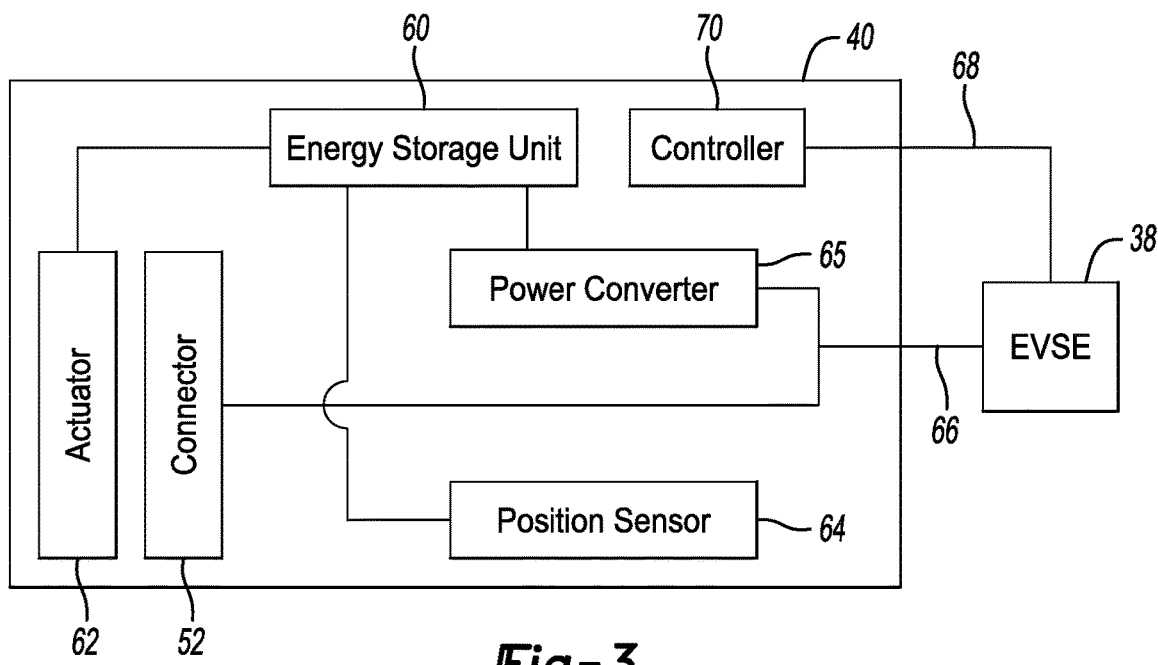
FIG. 3 is a schematic diagram of a hands-free charging system for a vehicle.

Referring to FIG. 3, some codes and regulations require that the connector 52 remain de-energized prior to connection with the vehicle. This creates a problem since the ground unit 40 requires power to communicate with the vehicle and to move the actuator(s) of the robotic system to plug the connector 52 into the vehicle charge port. To solve this and other problems, the ground unit 40 includes an energy storage device 60 configured to power actuators 62, a position sensor(s) 64, and/or other components associated with autonomously moving the robotic coupler 50 when the ground unit 40 is electrically disconnected from the high-voltage power supply 66 of the EVSE 38. The high-voltage supply 66 may be within the cord 44. The energy-storage device 60 may be a battery or a capacitor. The energy-storage device 60 may be 12 or 24 volts, for example, and may have a storage capacity of 1 amp-hour for example. The energy-storage device 60 has an associated power converter 65 that conditions the high-voltage power 66 received from the EVSE 38 to a voltage and/or current compatible with the energy-storage device 60. The power converter 65 may be a step-down or step-up converter or transformer. The power converter 65 may also include an inverter that converts received AC power into a DC power if the energy-storage device 60 is a battery or a capacitor.

In the ground unit 40, the one or more actuators 62 associated with the robotic coupler 50 are solely powered by the energy-storage device 60. This allows the robotic coupler 50 to be operated when the high-voltage power source 66 is electronically disconnected from the ground unit 40. The position sensor 64 may be powered by the energy-storage device 60, may be powered by a low-voltage power supply 68 (optional) of EVSE 38 through a controller 70, or both.

The position sensor 64 may be configured to provide a signal to the controller 70, indicative of a position of a vehicle charge port 34 relative to the connector 52. The position sensor 64 may be located on or near the connector 52 as shown in FIG. 2. The position sensor 64 may be configured to monitor or detect the position of a position feature disposed on or proximate the vehicle charge port 34. The position feature may be an emitter configured to provide or emit a magnetic field, infrared waves, optical waves, or a radio frequency configured to be detected or received by the position sensor 64. The position sensor 64 may be provided with a magnetic field sensor, an infrared receiver, photodetector array, or radio receiver configured to receive the magnetic field, infrared waves, optical waves, audio, ultrasonic, or radio frequency emitted by the position feature.

Figure 4:
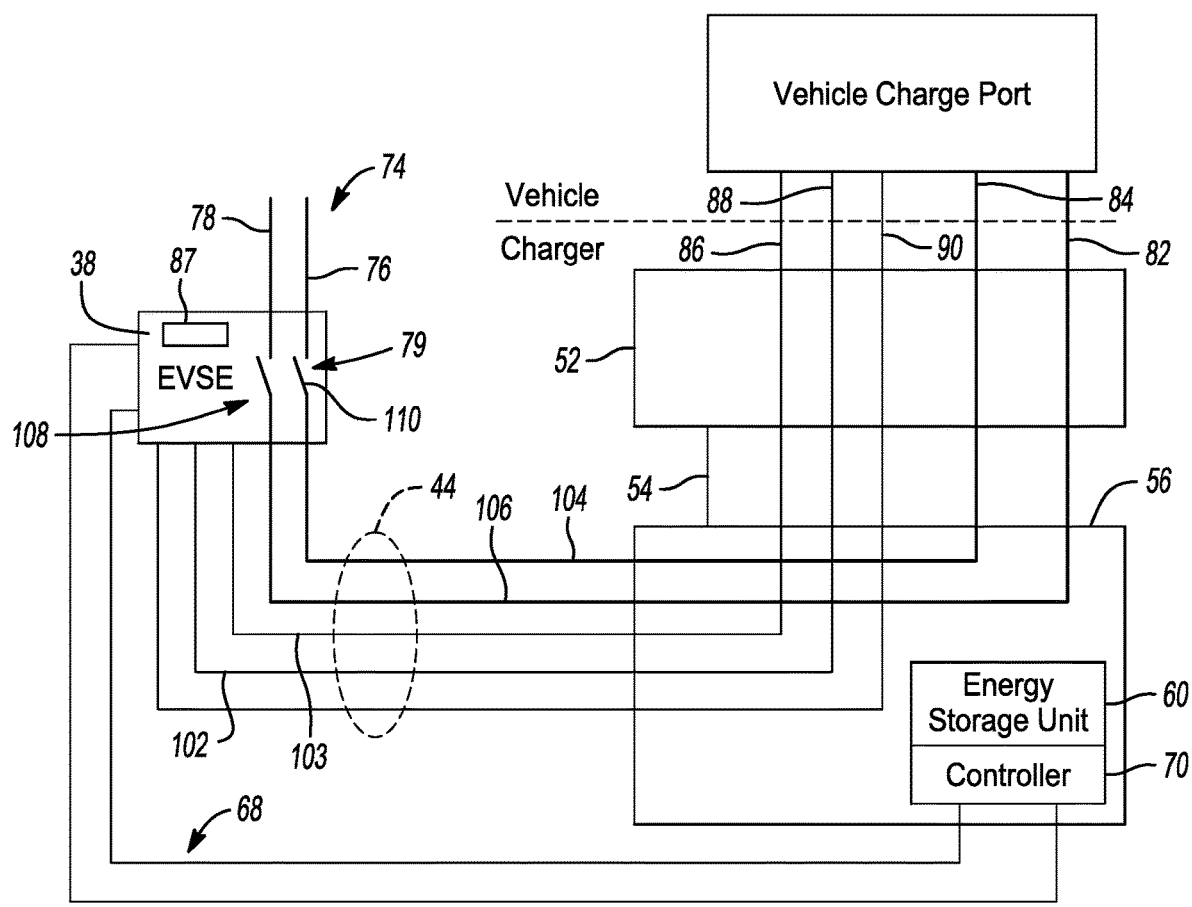
FIG. 4 is a schematic diagram of the hands-free charging system of FIG. 3 connected to a vehicle charge port.

FIG. 4 illustrates a schematic diagram of the ground unit 40 connected to the vehicle charge port 34. The EVSE 38 is connected to the power source 36 by wires 74 that may include a line 76 and a line/neutral 78. These wires may be connected to terminals 79 within the EVSE 38.

The connector 52 and the charge port 34 of the vehicle may be according to one or more standards such as SAE J1772. In one embodiment, the connector 52 may include five pins: two HV AC pins 82, 84, a proximity detection pin 86, a control pilot pin 88, and a ground pin 90. The pins may be male or female pins. The charge port 34 may include five matching pins: two HV AC pins, a proximity detection pin, a control pilot pin, and a ground pin. The pins may be male or female pins. For example, the connector 40 may include female pins and the port 34 may include male pins. In some embodiments, the connector and the port may include two additional pins for DC charging. Of course, SAE J1772 is just one example configuration and others are contemplated.

In one or more embodiments, a control pilot circuit 102 is used to control the charging process between the EVSE 38 and the on-board charger 32 among other functions and a proximity circuit 103 is used to determine a connection between the connector 52 and the vehicle charge port 34. The control pilot circuit 102 may include an oscillator configured to generate a plus-minus 12-volt pulse width modulation (PWM) signal (referred to as a control pilot signal) at 1 kilohertz (kHz) duty cycle for example. During operation, the duty cycle may vary. This PWM signal is commutated to the vehicle charger 32 over the cord/port and is detected by a vehicle controller. The control pilot signal passes through a resistor, e.g., a 1.0 kiloohm (kΩ) resistor, prior to the vehicle 12. In the charger 32, the circuit 102 includes a diode and a pair of parallel resistors. A first resistor may have a resistance of 2.74 kΩ and a second resistor resistance of 1.3 kΩ. The first resistor may be hardwired to ground, whereas the second resistor is connected to ground through a switch. The switch may be biased open and commanded closed in response to sensing of the control pilot signal. When the connector 52 is connected to the charge port 34, the control pilot signal voltage at the connector 52 may be defined by the voltage divider formed by the resistances of resistors relative to the ground. The resulting voltage may indicate to the vehicle controller and the EVSE controller 87 that the connector 52 is correctly connected to the charge port 34. Closing the switch connects the second resistor to ground and induces a voltage change detected by the EVSE 38.

The EVSE 38 is configured close a switching arrangement 108 in response to detecting the voltage change allowing power to flow from the EVSE 38 to the vehicle charge port 34 though the HV lines 104 and 106. The switching arrangement 108 may include relays, contactors, switches, or any other device capable of electrically connecting and disconnecting the terminals 79 to the high-voltage lines 104 and 106. In the illustrated embodiment, a pair of contactors 110 are used. The contactors 110 are controlled by the controller 87 as will described in detail below. The controller 87 is configured to modify the charging voltage and current based on the signals of the control pilot circuit 102. Further details of a control pilot circuit, a proximity circuit, and charging protocols are described in Applicant's U.S. Pat. No. 10,046,661 (issued Aug. 14, 2018), the contents of which are incorporated in their entirety by reference herein.

The controller 70 and 87 operate in conjunction with the vehicle controller to operate the hands-free charging system and charge the vehicle. In some embodiments, these pair of controllers may be replace with a single controller. While illustrated as separate controllers 70, 78, these controllers are in communication with each other and may generally be referred to as a controller herein and in the claims. Therefore, any reference to "a controller" refers to one or more controllers. Each controller may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controllers communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by a controller within each of the subsystems identified above.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5A:
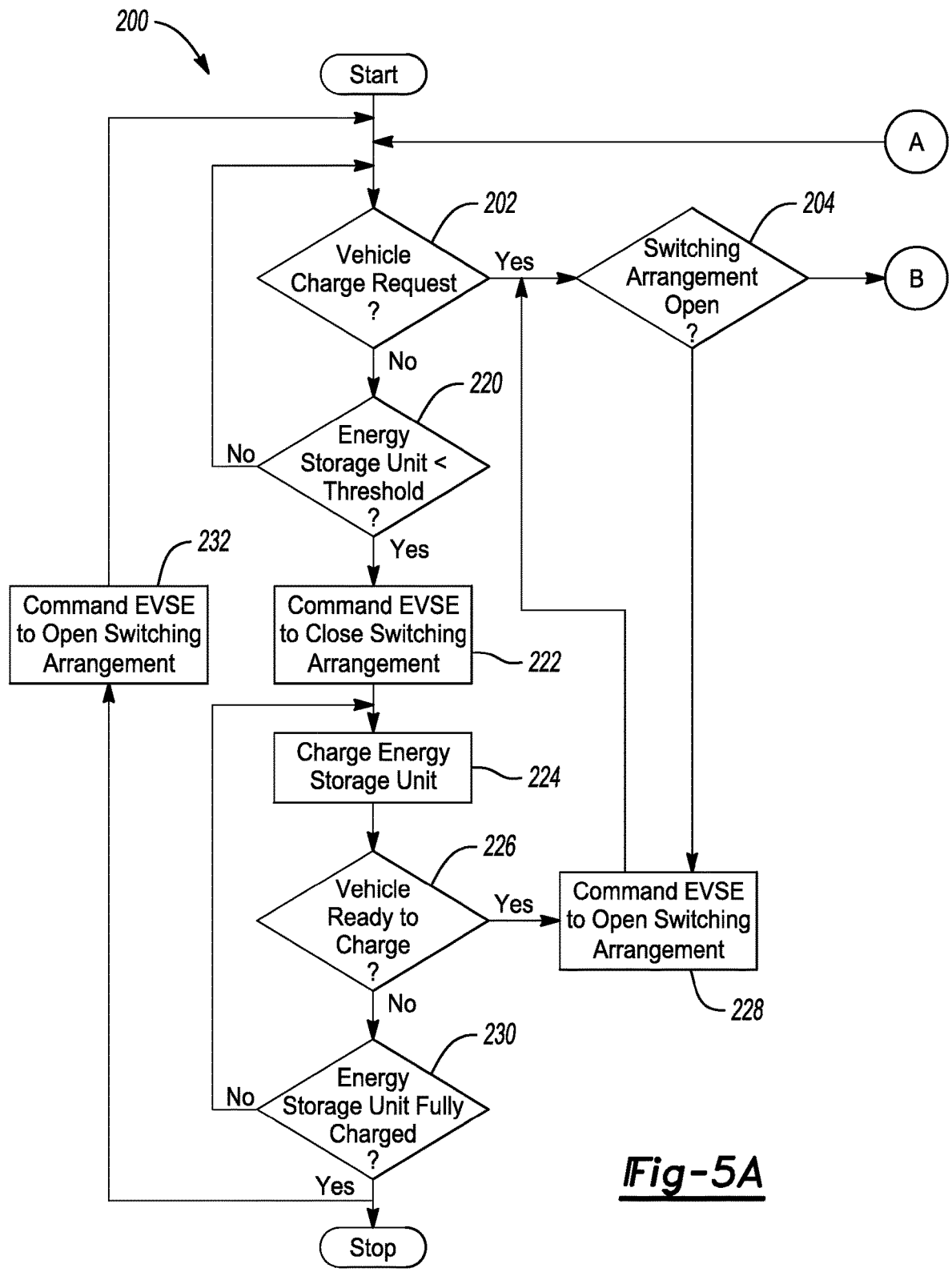
FIGS. 5A and 5B show a flow chart of an algorithm for charging a vehicle with the hands-free charging system.
Figure 5B:
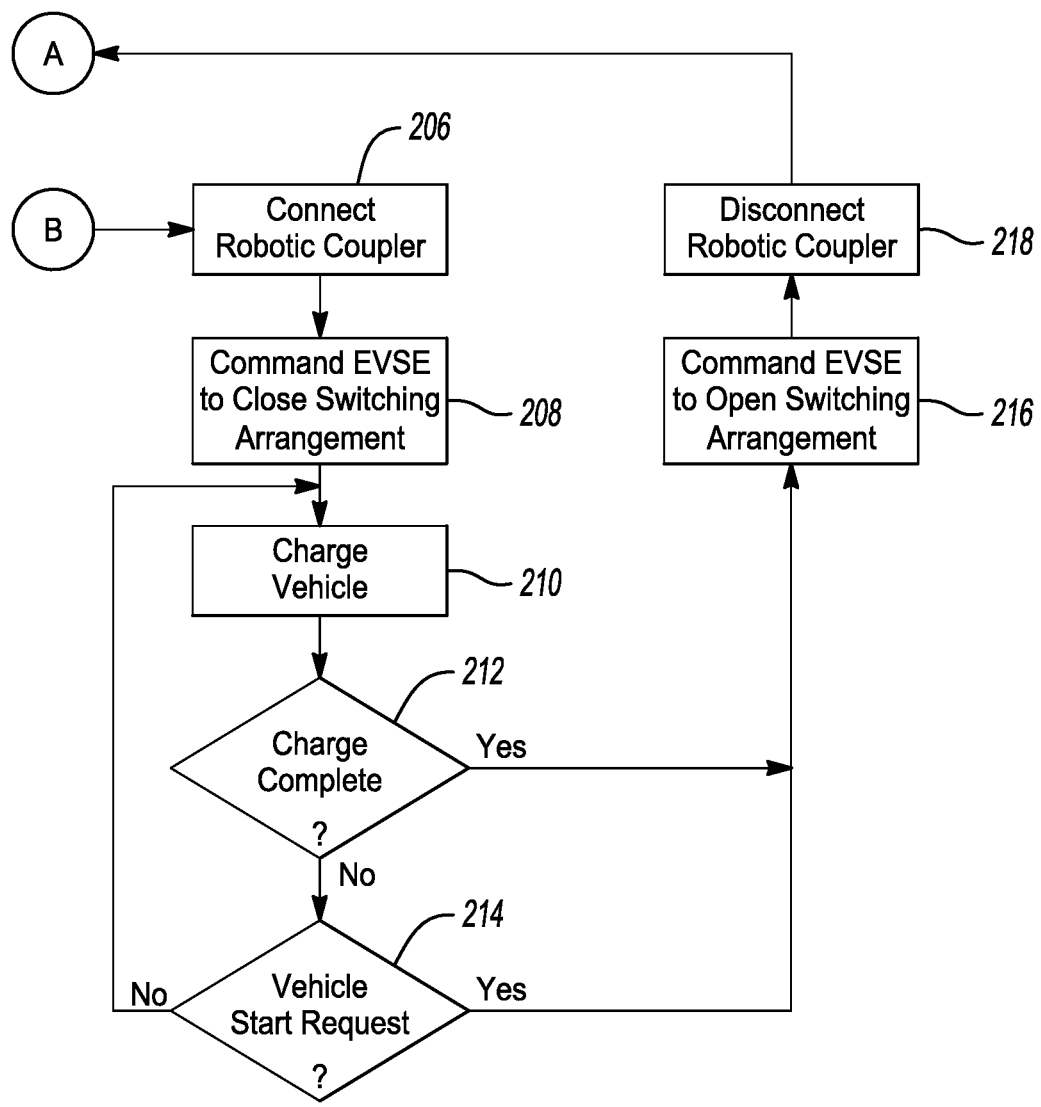

FIGS. 5A and 5B show a flowchart 200 of an algorithm for controlling the hands-free charging system. For ease of description, the flowchart 200 will be described in conjunction with the above-described illustrated embodiment. It is to be understood, however, that the flowchart of 200 is equally applicable to other embodiments. At operation 202, the controller determines if a vehicle charge request has been received. If yes, control passes to operation 204, and the controller determines if the switching arrangement 108 is open. If no, control passes to operation 228 where the switching arrangement is commanded open. If yes, control passes to operation 206 and the robotic coupler 50 is connected to the vehicle. As described above, the robotic coupler 50 is actuated while the terminals of the connector 52 are deenergized due to the switching arrangement 108 being open. As such, robotic coupler 50 is powered solely by the energy-storage device 60. In operation 206, the controller is programmed to command movement of the actuator, using power from the energy-storage device, to couple the connector to the vehicle charge port while the ground unit is electrically disconnected from the power source.

Once the connector is inserted into the vehicle charge port, the control pilot circuit 102 and the proximity circuit 103 become operational and the switching arrangement 108 is closed once these signals are validated. Closing the switching arrangement 108 electrically connects the high-voltage pins 82 and 84 to the high-voltage lines 76 and 78 energizing the connector 52 to charge the vehicle at operation 210. At operation 212, the controller determines if the vehicle traction battery is completely charged. If no, control passes to operation 214 and the controller determines if a vehicle start request has been received. If no, charging continues. If yes at either operation 212 or 214, the switching arrangement 108 is opened to end charging at operation 216. Once the switching arrangement 108 is opened and the connector 52 is deenergized, the energy-storage device 60 powers the actuators of the robotic coupler 50 to disconnect the charging system from the vehicle at operation 218.

Since the robotic coupler 50 is powered solely by energy-storage device 60, the state of charge of the energy-storage device 60 must be maintained above a threshold otherwise the hands-free charging system becomes inoperable. At operation 220, the controller determines if the energy-storage device is less than a threshold charge. The controller may monitor the battery SOC, Voltage, etc, verses one or more thresholds. The threshold may be set such that the energy-storage device 60 has sufficient charge to connect the robotic coupler 50 to the vehicle. If the energy-storage device is determined to be sufficiently charged at operation 220, control loops back until a charging request is received or the energy-storage device becomes low on charge. Charged refers to a condition in which the battery has sufficient energy to enable functionality of the system. If charging is required, control passes to operation 222 and the switching arrangement 108 is closed to electrically connect the power converter 65 with the high-voltage lines 76, 78. The wall power is then used to charge the energy-storage device 60 while the power converter 65 modifies the received power to be compatible with the energy-storage device 60 at operation 224. During charging of the energy-storage device 60, the terminals of the connector 52 may be energized. The cover 53 prevents these terminals from contacting objects during this time.

The vehicle may request charging of the traction battery while the energy storage device 60 is being charged as shown in operation 226. If such a request is received, the control passes to operation 228 where the switching arrangement 108 is opened to end charging of the energy-storage device 60. Operations 206 through 218 are then performed to charge the traction battery as described above.

If no at operation 226, charging continues until the energy-storage device is fully charged as determined at operation 230. If the energy-storage device is fully charged, control passes operation 232 and the switching arrangement is commanded open. Control then passes back to operation 202 and the hands-free charging system remains idle until a charging request is received from the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hands-free charging system comprising:
   an electrical power source;
   a ground unit electrically connected to the power source and including an energy-storage device and a robotic coupler having a connector and an actuator configured to autonomously move the connector into engagement with a vehicle charge port, wherein the energy-storage device is configured to power the actuator;
   a switching arrangement configured to selectively electrically connect the power source to the energy-storage device and to the connector; and
   a controller programmed to, in response to a request to charge a vehicle, (i) command the switching arrangement such that the connector is electrically disconnected from the power source, (ii) command movement of the actuator, using power from the energy-storage device, to couple the connector to the vehicle charge port while the connector is electrically disconnected from the power source, and (iii) command the switching arrangement such that the connector is electrically connected to the power source after the connector is coupled to the vehicle charge port.

2. The hands-free charging system of claim 1, wherein the controller is further programmed to, in response to a request to end charging, (i) command the switching arrangement to electrically disconnect the connector from the power source and (ii) command movement of the actuator, using power from the energy-storage device, to de-couple the connector from the vehicle charge port while the connector is electrically disconnected from the power source.

3. The hands-free charging system of claim 1, wherein the controller is further programmed to, in response to the energy-storage device being low on charge, command the switching arrangement such that the energy-storage device is electrically connected to the power source.

4. The hands-free charging system of claim 1, wherein the controller is further programmed to, in response to the energy-storage device being low on charge, (i) command the switching arrangement such that the energy-storage device is electrically connected to the power source and (ii) command the switching arrangement such that the energy-storage device is electrically disconnected from the power source once the energy-storage device is charged.

5. The hands-free charging system of claim 1, wherein the system further comprises:
   a wall unit; and
   a cord connecting the wall unit to the ground unit.

6. The hands-free charging system of claim 5, wherein the switching arrangement includes one or more contactors disposed in the wall unit and configured to disconnect the ground unit from the power source when open.

7. The hands-free charging system of claim 5, wherein the power source is a power grid.

8. The hands-free charging system of claim 1, wherein the energy-storage device is a battery.

9. The hands-free charging system of claim 1, wherein the energy-storage device is a capacitor.

10. The hands-free charging system of claim 1 further comprising a power converter configured to convert alternating current to direct current.

11. A hands-free charging system comprising:
- an electric vehicle supply equipment (EVSE) configured to electrically connect to a power source and including a switching arrangement;
- a ground unit connected to the EVSE by a cable, the ground unit including an energy-storage device and a robotic coupler having an actuator configured to move a connector into engagement with a vehicle charge port, wherein the energy-storage device is configured to power the actuator; and
- a controller programmed to, in response to a request to charge a vehicle, (i) command the switching arrangement such that the ground unit is electrically disconnected from the power source, (ii) command movement of the actuator, using power from the energy-storage device, to couple the connector to the vehicle charge port while the ground unit is electrically disconnected from the power source, and (iii) command the switching arrangement such that the ground unit is electrically connected to the power source once the connector is coupled to the vehicle charge port.

12. The hands-free charging system of claim 11, wherein the switching arrangement includes at least one contactor that electrically disconnects the ground unit from the power source when open, and wherein the command the switching arrangement such that the ground unit is electrically disconnected from the power source includes opening the at least one contactor.

13. The hands-free charging system of claim 11, wherein the EVSE includes first and second terminals configured to connect with the power source and first and second contactors associated with the first and second terminals, respectively.

14. The hands-free charging system of claim 13, wherein the command the switching arrangement such that the ground unit is electrically disconnected from the power source includes opening the first and second contactors to disconnect the ground unit from the first and second terminals.

15. The hands-free charging system of claim 11, wherein the controller is further programmed to, in response to a request to end charging, (i) command the switching arrangement to electrically disconnect the ground unit from the power source and (ii) command movement of the actuator, using power from the energy-storage device, to de-couple the connector from the vehicle charge port while the connector is electrically disconnected from the power source.

16. The hands-free charging system of claim 11, wherein the controller is further programmed to, in response to the energy-storage device being low on charge, command the switching arrangement such that the energy-storage device is electrically connected to the power source.

17. The hands-free charging system of claim 11, wherein the energy-storage device is a battery or a capacitor.

18. A method of charging a vehicle with a hands-free charging system including a connector configured to connect to a vehicle charge port, an energy-storage device, and an actuator configured to autonomously connect the connector to the vehicle, the method comprising:
- in response to a request to charge a vehicle:
  - operating a switching arrangement of the hands-free charging system to electrically disconnect the actuator and the connector from a power grid;
  - operating the actuator, using power from the energy-storage device, to couple the connector to the vehicle charge port while the connector and the actuator are electrically disconnected from the power grid;
  - operating the switching arrangement to electrically connect the connector to the power grid; and
  - charging the vehicle using the power grid.

19. The method of claim 18 further comprising:
- in response to a request to end charging:
  - operating the switching arrangement to electrically disconnect the connector from the power grid; and
  - operating the actuator, using power from the energy-storage device, to de-couple the connector from the vehicle charge port while the connector is electrically disconnected from the power grid.

20. The method of claim 18 further comprising:
- in response to the energy-storage device requiring charge:
  - operating the switching arrangement to electrically connect the energy-storage device to the power grid;
  - charging the energy-storage device using the power grid; and
  - operating the switching arrangement to electrically disconnect the energy-storage device from the power grid once the energy-storage device is charged.

* * * * *